April 30, 1957 H. R. CHOPE 2,790,945
MEASURING SYSTEM
Filed May 5, 1952 3 Sheets-Sheet 3

INVENTOR.
Henry R. Chope
BY Philip M. Dunson
ATTORNEY.

United States Patent Office 2,790,945
Patented Apr. 30, 1957

2,790,945

MEASURING SYSTEM

Henry R. Chope, Columbus, Ohio, assignor to Industrial Nucleonics Corporation

Application May 5, 1952, Serial No. 286,219

12 Claims. (Cl. 318—28)

This invention relates to a measuring system, and more specifically to an improved electro-mechanical measuring system that is particularly suitable for use in continuously measuring the values of a variable characteristic translatable into an input voltage applied to such measuring system.

The present invention is especially useful in a continuously measuring thickness gauge whose reading depends upon the amount of radiation absorbed by a material interposed between a source of radiation and a radiation detector. It will be apparent from the following specification that the measuring system of this invention is applicable to many types of measurements, but the advantages of the present invention are particularly important in measurements involving radiation and radiation detection. For convenience the invention is illustrated in the drawings and described herein as embodied in a thickness gauge. Since this invention is especially applicable to problems encountered in radiation-type instruments, such problems are discussed herein to aid in setting forth some of the objects of the invention. Some of the features of the equipment disclosed for completeness of description but not claimed herein are claimed in the copending application for U. S. Letters Patent of Henry R. Chope, Serial No. 286,220.

In the past, many circuits have been devised for use in radiation thickness gauges. These instruments all rely for their operation upon a determination of how much radiation has been absorbed by a given material. Various arrangements have been used in the construction of these instruments. The earlier devices generally provided means for comparing the radiation of the same original intensity passing through a material of known qualities. This latter method was found to be inconvenient where the types of material to be measured were changed at frequent intervals.

Later circuits have attempted to alleviate this difficulty by the use of direct measuring techniques, whereby the intensity of unabsorbed radiation is of a predetermined amount, and determination of how much radiation is absorbed by a material can easily be calculated with reference to the intensity of this predetermined unabsorbed radiation. This technique has been made practical recently by the availability of radioactive isotopes that are stable in their decay characteristics, and have long half lives.

This direct testing method, however, has introduced a new source of error. The reliability of direct measuring instruments depends to a large extent upon the gain stability of the various circuits used. To attain the necessary gain stability, the usual type of instrument utilizes a null-balance amplifier circuit, so that the associated amplifier circuits always operate about a fixed operating level, and the readings given by the instrument are independent of the gain of the amplifier.

Industrial requirements for thickness gauges generally dictate the use of continuous measuring devices, and the null-balance type of circuit is very easily adaptable to a continuous measuring system. A servo-mechanism is actuated by the output of the associated amplifier, and the servo-mechanism controls the amount of voltage fed back to the input of the amplifier system. An indicator attached to the servo-mechanism shows the amount of voltage fed back.

In a null-balance circuit the amount of voltage fed back is equal in magnitude and opposite in polarity to any input signal voltage within the limits of the system sensitivity. Therefore, if the input signal voltage is derived from a radiation detecting circuit whose output is proportional to any incident radiation, the indicator provides a continuous reading proportional to the radiation falling upon the radiation detector. If a radioactive source with a long half life is used, the unabsorbed average intensity emitted from such source is substantially constant, and the indicator reading for a given absorber placed between the source of radioactivity and the radiation detector is proportional to the thickness of such absorber.

The current output of a radiation detector is very small, so in order to develop a voltage of measurable magnitude this current must pass through a circuit element of very high resistance. Therefore, the impedance of the input circuit in the amplifier must be exceptionally high, and ordinary voltage measuring techniques may not be used. The usual practice is to employ an electrometer tube having very low grid current and correspondingly high input impedance. Tubes of this type are very sensitive and excessive voltages applied to their grids may cause damage or changes in their electrical characteristics.

In industrial applications, sudden variations frequently occur in the thickness of the materials being measured. The thickness of the material may be changed accidentally or purposely in a continuous rolling operation, or the material may be accidentally or purposely broken during such operation. If the variations in thickness of material are very large, large voltage pulses appear at the grid of the electrometer tube, and result in damage to the tube. This damage usually takes the form of changes in the emission characteristics of the tube, thereby changing the operating point of the tube. In a direct-coupled amplifier, changing the operating point of an amplifier tube has the same effect as introducing an extraneous signal to the input. After being subjected to a large input pulse, it may take several hours for the electrometer tube to reach a constant, or stable operating point. Thus the effect of damage to the tube is similar to that of an extraneous signal input of varying amplitude.

Because the accuracy of the measuring instrument depends upon the zero stability of the amplifier system, any damage to the electrometer tube causing a change in the operating conditions of the amplifier results in inaccurate readings of such instrument. While the servo-mechanism feedback system tends to cancel out these large input voltage variations, the response time of a mechanical system is relatively slow and consequently pulses whose rate of rise exceeds the rebalancing speed of the servo-mechanism are not cancelled out in sufficient time to eliminate possible damage to the amplifier.

Since the servo-mechanism feedback system cannot immediately cancel out incoming signals to the amplifier, the signals impressed upon the grid of the electrometer tube must be limited in amplitude and in the rate of rise in order to prevent measuring system instability from circuit drifts as described above. If the total span of voltage input to the grid of the electrometer tube is thus limited then the incremental span of voltage input caused by a variation in radiation detected is proportionally limited. For example, if the allowable variation of input voltage to the grid of the electrometer tube is one volt, this one volt variation must correspond to the total range of thickness of absorbers to which the instrument will respond. In normal applications, however, the instrument is subjected on one extreme to no absorber at all, and on the other extreme to absorbers that reduce the unabsorbed radiation nearly to zero.

If the source of radiation is composed of a radioactive isotope that emits mainly beta particles, the amount of radiation absorbed by a material is approximately proportional to the logarithm of the thickness of the material. In the measurement of small variations in thickness, however, it is generally assumed that the incremental variation in radiation absorbed is directly proportional to the incremental variation in thickness. Thus, if it is desired to measure within plus or minus one percent a material that absorbs enough radioactivity that only 0.1 volt appears at the input of the amplifier, then the incremental variation of plus or minus one percent in the thickness of the material will cause an incremental variation of the order of plus or minus millivolts signal to the input of the amplifier. The variation of absorption as a function of thickness is somewhat different for a radioactive isotope that emits gamma rays, but the signal input voltage variations to the amplifier are of the same order of magnitude as those in the foregoing example. The term "thickness" is used herein for convenience, although the quantity actually measured is the weight per unit area of a material. The use of the term "thickness" is strictly correct only if the material measured has a constant electron density.

An inherent disadvantage of any vacuum tube amplifier system is that noise voltages are created within the amplifier itself. The minimum signal that can be amplified practicably in any such amplifier depends upon the amplitude of these noise voltages. If the total input voltage span is limited to a value low enough to obviate any possibility of damage to the electrometer tube in the input stage of the amplifier, the sensitivity to small changes in thickness of the measured material is lost, because the change in voltage input produced by a small change in the material's thickness may be below the noise level. If, on the other hand, the sensitivity of the radiation detector circuit is increased so as to provide input voltages well above the noise level for small changes in thickness of the measured material, the total voltage span between the conditions of no absorption and very high absorption is so great as to risk damage to the electrometer tube.

It is a primary object of this invention, therefore, to provide a measuring system having an amplifier in which the amplifier input tube is protected against large or sudden variations of input voltage, so that input circuits of high sensitivity may be used therewith.

It is also an object of this invention to provide a measuring system for a variable characteristic translatable into a variable input voltage comprising an amplifier, electrical negative feedback means, and electro-mechanical means providing a variable voltage opposing such input voltage.

Another object is to provide an improved measuring system having means for instantaneous substantial cancellation of any variation in input voltage.

A further object of the present invention is to provide, in a measuring system, for a variable characteristic translatable into a variable input voltage, an amplifier, an electrical degenerative feedback network, and a servomechanism operated feedback network. An additional object is to provide such a measuring system in which such input voltage is developed by a radiation detector connected to a high resistance.

Still a further object of this invention is to provide a measuring system for a variable characteristic translatable into a variable input voltage having a first amplifier, an electrical feedback circuit, a second amplifier circuit responsive to current in said electrical feedback circuit, and a servo-mechanism controlling a voltage opposing such input voltage; and which may have means connected to said servo-mechanism for recording the value of said variable characteristic.

Other objects and advantages of the invention will be apparent from the following specifications.

Figure 1:
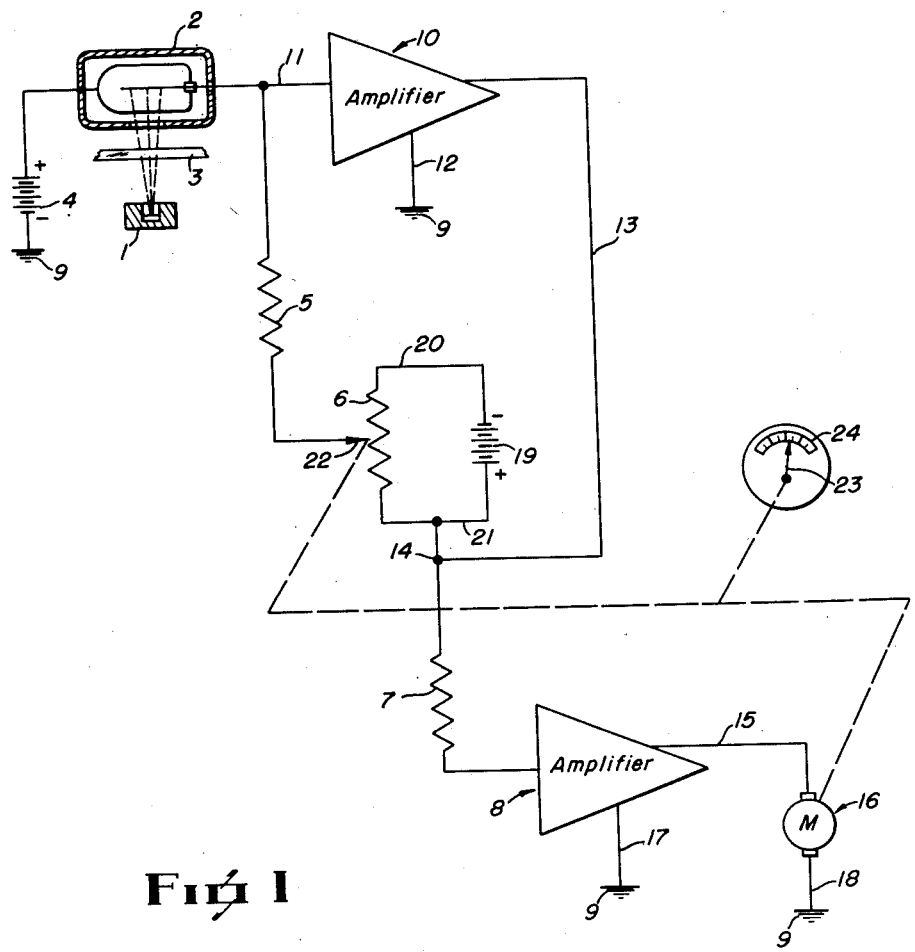
Figure 1 is a simplified schematic diagram showing a measuring system embodying the principles of this invention.

Referring to Figure 1, which shows a simplified form of the invention, radioactive source 1 is constructed and positioned to direct a beam of penetrative particles or rays upon a radiation detector 2. The radioactive source 1 may be composed of any one of a number of radioactive isotopes such as strontium 90 or carbon 14. The material 3 to be measured intercepts the beam of radiation emitted from said radioactive source 1, absorbing and scattering a certain amount of the radiation. The radiation detector 2 responds to any remaining radiation that has passed through material 3. The radiation detector 2 may be any of the commonly used types of radiation detectors, such as Geiger-Muller tubes, ionization chambers, scintillation, or crystal detectors. For purposes of illustration only, radiation detector 2 is shown in the drawings as an ionization chamber.

A battery or other suitable voltage source 4 supplies a high voltage, commonly 300 volts or more, across the electrodes of the radiation detector 2 through a circuit including a high resistance 5, a voltage divider or slide-wire 6, a feedback resistor 7, and a low impedance input of amplifier 8 to the common electrical ground in the system as indicated at 9. It is well known in the art that when radiation is caused to fall upon an ionization chamber in such a circuit, a circulating current flows through the circuit, and that this current will be independent of the magnitude of the resistance in the circuit. This circulating current produces a voltage across the high resistance 5. The circulating current is so minute that the voltage drop across the other elements in the circuit is negligible. Typical values of resistance for the elements in the aforegoing circuit are 2,000 megohms for the high resistance 5, only 7,000 ohms for the voltage divider 6, and 50,000 ohms for the feedback resistor 7. The input impedance of the amplifier is negligible. Since the resistance of the high resistance 5 is more than 30,000 times as much as the total resistance of the voltage divider 6 and the feedback resistor 7, it is apparent that for all practical purposes the entire voltage produced by the minute current from the ionization chamber 2 is across the high resistance 5.

The input end of a direct-coupled amplifier 10 is connected to one end of the high resistance 5 by line 11. The amplifier 10 is grounded at 9 through line 12. The voltage at the input of the D. C. amplifier 10 consists of the sum of the individual voltages appearing across the high resistance 5, the voltage divider 6, and the feedback resistor 7. The output voltage of the direct-coupled amplifier 10, connected by line 13 to point 14, appears across the feedback resistor 7. Any current flowing through the feedback resistor 7 also flows in the low impedance input stage of the amplifier 8, which will be called the second amplifier in this description. The output of the second amplifier 8 is connected through line 15 to a servomotor 16.

The second amplifier 8 is grounded to point 9 by line 17, and the servomotor 16 is similarly grounded by line 18. A potential of opposite polarity to the voltage across high resistance 5 is connected across the voltage divider 6 from a battery or other suitable source of potential 19 by lines 20 and 21. The servomotor 16 is connected to drive a movable arm 22 of voltage divider 6, and thereby to control the fraction of the voltage across voltage divider 6 applied in opposition to the voltage across the high resistance 5. The servomotor 16 is also mechanically coupled to an indicator arm 23, to indicate on the associated scale 24 the position of the arm 22 of voltage divider 6.

If the thickness of the measured material 3 decreases, more radiation from the radioactive source 1 passes through the material 3, and reaches the radiation detector 2. This causes an increase in the circulating current through the radiation detector circuit, and as a result, the input line 11 to amplifier 10 becomes more positive with respect to the ground potential at points 9. The D. C. amplifier 10 immediately amplifies this increase of input voltage and feeds back an opposing voltage to point 14.

Consider the case in which the voltage from point 14 to the movable arm 22 is equal and opposite to the voltage across the high resistance 5, and the net voltage above ground point 9 present at line 11 therefore is zero, just prior to the aforementioned increase in voltage across the high resistance 5. Now let the increase in voltage across the high resistance 5 be 100 millivolts and assume the gain of the direct-coupled amplifier 10 is 99. The increased voltage at line 11 immediately produces the condition in which a negative feedback voltage of 99 millivolts is fed back to point 14 with a net increase in the voltage at line 11 of only 1 millivolt, a mere one percent of the increase in voltage across the high resistance 5. It is apparent from the foregoing discussion that the input stage of the amplifier 10 is protected from sudden large changes of input voltage by the electrical feedback provided at point 14. Of course, amplifier 10 may have much higher gain to provide further reduction in the net change of voltage at line 11 for a given change in voltage across high resistance 5.

Despite the fact that the input stage of amplifier 10 is thus protected, the sensitivity of the measuring circuit to small input voltage changes is not thereby impaired, because the voltage fed back to point 14 produces a current in the feedback resistor 7 and the low-impedance input of the second amplifier 8. Whenever any such current flows in the input circuit of the second amplifier 8, the amplified output from the second amplifier to line 15 causes the servomotor 16 to turn. The second amplifier 8 responds oppositely to opposite directions of input current flow so the polarity of the voltage fed back to point 14 determines the direction of rotation in the servomotor 16. The servomotor 16 is connected so as to move the arm 22 of voltage divider 6 in such a direction as to reduce or eliminate any current flow in the input circuit of the second amplifier 8. The servo-motor 16, the movable arm 22, and the voltage divider 6 thus comprise a servo-mechanism operated degenerative feedback network.

In the case just considered the servomotor 16 moves the arm 22 upward on voltage divider 6 until the opposing voltage present between point 14 and movable arm 22 is increased in magnitude by 100 millivolts. As this action takes place the net voltage at line 11 and the voltage fed back to point 14 are decreased simultaneously to zero. In this balance condition the voltage from point 14 to movable arm 22 is equal and opposite to the voltage across the high resistance 5, the voltage fed back from amplifier 10 to point 14 is zero, and no current flows in the low-impedance input to the second amplifier is. Therefore, the output from second amplifier 8 is zero, and the servomotor 16 stops. Of course, an increase in thickness of the measured material 3 produces operations similar to those described for a decrease in such thickness, but in opposite directions, to restore a balanced condition in the measuring system.

Since the voltage from point 14 to the arm 22 of the voltage divider 6 is opposite in polarity and has the same magnitude as the voltage created by the circulating radiation detector current in the high resistance 5, and the voltage across said high resistance is proportional to the intensity of the radiation from source 1 reaching the radiation detector 2, the position of arm 22 provides a measure of the intensity of such radiation. The indicator arm 23 mechanically connected to the arm 22 of the voltage divider 6, and to the servomotor 16, indicates the relative intensity of radiation on its associated scale 24 which may be calibrated in terms of thickness of the material 3 being measured.

It is of particular importance to this device that the immediate action of the electrical feedback from the output of amplifier 10 through line 13 to point 14 in the input voltage circuit prevents any appreciable variation in the potential at the input line 11 to the direct coupled amplifier 10.

Figure 2:
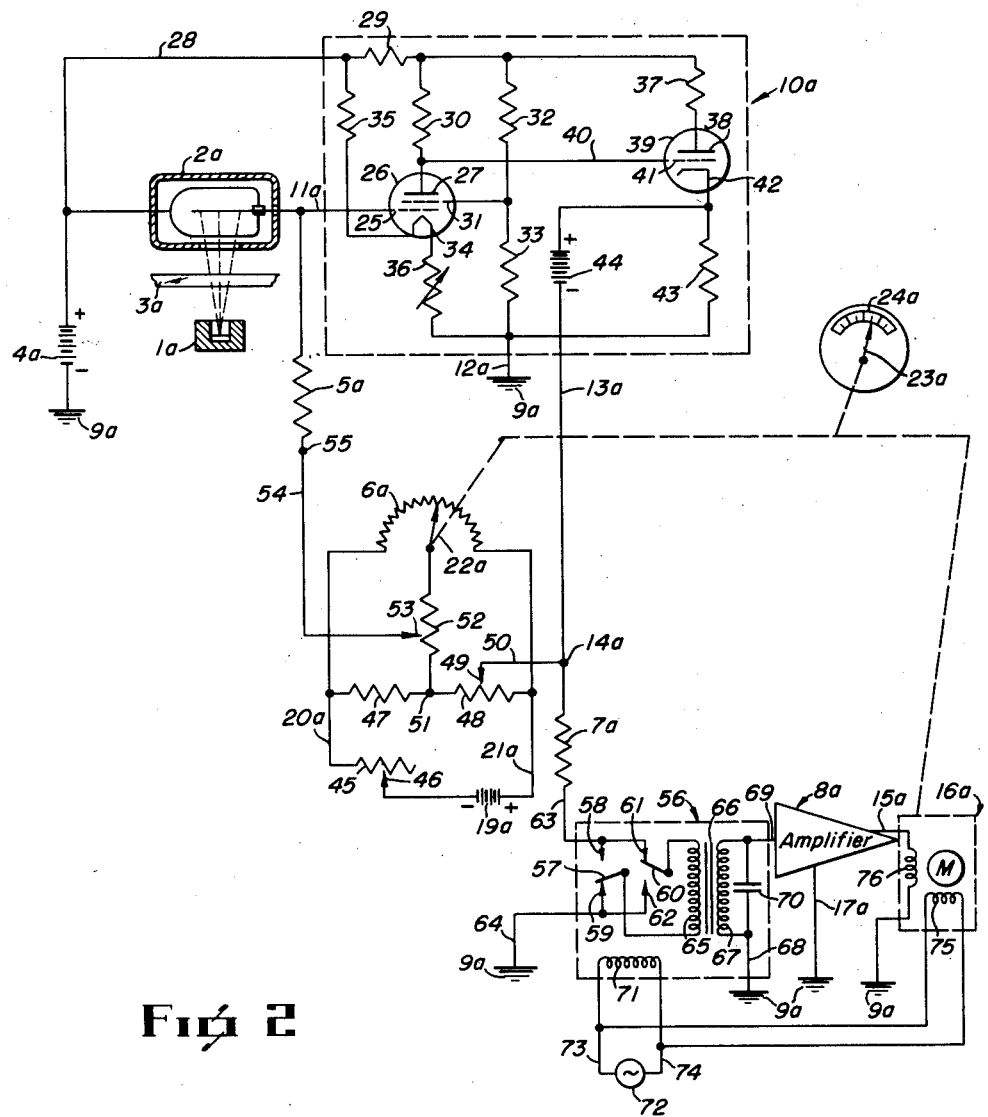
Figure 2 is a schematic diagram illustrating a preferred form of the invention of Figure 1 in a radiation measuring system having a direct current input.

Referring now to Figure 2, the components and points designated by the reference characters 1a through 24a correspond to the components and points in Figure 1 designated by the same respective numerals without any subscripts. Figure 2 shows further details of certain components of the embodiment of the invention shown in Figure 1 and is intended to illustrate a preferred form of the low-impedance input to the second amplifier; so this part of the circuit is shown in detail while the remainder of the second amplifier, which may comprise any suitable A. C. amplifier circuit, conventional or otherwise, is represented by the usual amplifier symbol at 8a. A preferred circuit for the first amplifier designated generally by 10a is shown also in Figure 2 to illustrate the use of an electrometer tube in the input stage of such amplifier and to bring out other preferred details of operation. A detailed circuit for providing a voltage opposing the input voltage across the high resistance 5a is also illustrated, and the servomotor associated therewith is illustrated in Figure 2 as a two-phase reversible motor designated generally by 16a.

The input line 11a is connected to the control grid 25 of an electrometer type tube 26 in the input stage of the direct-coupled amplifier 10a. The battery or other suitable voltage source 4a which is grounded at 9a, and which may be a conventional power supply, furnishes the proper voltage for the plate 27 of the electrometer tube 26 through the line 28 and the resistors 29 and 30. Screen grid voltage at 31 is supplied from the same source through the line 28 and the resistors 29 and 32, with a resistor 33 connected from the screen grid 31 to ground at 9a to complete the voltage dividing circuit. Power to the filament 34 of the electrometer tube 26 is connected from the voltage source 4a through line 28, a resistor 35, filament 34, and a variable resistance 36 to ground at 9a.

The voltage source 4a is connected through the line 28, resistor 29, and resistor 37 to provide the proper voltage at the plate 38 of the output tube 39 of the amplifier 10a. The output voltage at the plate 27 of the electrometer tube 26 is connected by a line 30 directly to the grid 41 of output tube 39. The indirectly heated cathode 42 of output tube 39 (heater and conventional heater supply not shown) is connected through a load resistor 43 to ground at 9a. The ouput of amplifier 10a, across the cathode load resistor 43 is fed back to the point 14a through a battery or other suitable potential source 44 and line 13a. The variable resistance 36 in the filament circuit of the electrometer tube 26 is adjusted to provide zero net voltage, with respect to ground 9a, to the point 14a for zero net input voltage at line 11a. For this condition the voltage across the load resistor 43 is equal and opposite to the potential of source 44. This potential source 44 provides a constant potential difference between the cathode 42 of output tube 39 and the feedback point 14a.

The battery or other suitable voltage source 19a introduces a voltage into the circuit to oppose any voltage present across the high resistance 5a. This opposing voltage is applied across the variable voltage divider or slidewire 6a through a resistor 45 having an adjustable arm 46 to control the amount of voltage across the slidewire 6a. Resistors 47 and 48, which preferably have equal resistances, are connected in series across the slidewire 6a, and the resistor 48 is provided with an adjustable arm 49 connected by a line 50 to the point 14a to permit adjustment of the opposing voltage with respect to the point 14a. From the point 51 between the resistors 47 and 48 a resistor 52 is connected to the movable arm 53 on the resistor 52, connected by a line 54 to point 55 at one end of the high resistance 5a, permitting variation of the voltage span obtainable between point 14a and point 55.

The arm 46 of resistor 45 is adjusted to provide the desired voltage across the slidewire 6a. This voltage may be measured or standardized in any suitable manner. Readjustment of arm 46 may be required from time to time to compensate for sources of error that may be present in the measuring equipment, or to compensate for drifting of the amount of voltage provided by the source 19a.

With a net input voltage present at line 11a corresponding to the desired thickness of the measured material 3a, the arm 49 of resistor 48 is adjusted to provide the center-scale reading by the indicator arm 23a on its associated scale 24a. The movable arm 22a of slidewire 6a, which is mechanically connected to the indicator arm 23a and to the servo-motor 16a hereinafter described, is at its center position under this condition.

The adjustable arm 53 of resistor 52 is set to provide the desired span of voltages to oppose the input voltages that may be developed across the high resistance 5a. With the arm 22a in its center position it is at the same potential as that of point 51 and all points on the resistor 52 are, of course, at that same potential. With the arm 22a moved to a point having a potential of one volt above the potential at point 51, however, the point on resistor 52 that is at one-tenth of the resistance between point 51 and arm 22a has a potential of only one-tenth volt above the potential at point 51, and similarly for other potentials at arm 22a and for other points on resistor 52. If the voltage across the slidewire 6a is two volts (one volt each way from center) and it is desired to measure voltages over a range of one volt (one-half volt each way from center) the adjustable arm 53 of resistor 52 is set to provide a full-scale reading by the indicator 23a with a net input voltage at line 11a that is one-half volt away from the center-scale voltage. The setting of the arm 53 in this case is at the middle of the resistor 52.

The operation of the measuring system of Figure 2 is the same as that described in connection with the system of Figure 1. When a change in net input voltage at line 11a is amplified and fed back by the direct-coupled amplifier 10a to the point 14a, a current is produced by said fed back voltage in the feedback resistor 7a and in the low-impedance input device indicated generally at 56 which also serves as a "chopper" to convert the direct current to alternating current. A suitable device for this purpose is manufactured by The Bristol Company, of Waterbury, Connecticut, and has been given the name "Synchroverter." The Synchroverter 56 includes vibrating arms 57 and 60, associated with contacts 58, 59, 61, and 62. The upper contacts 58 and 61 are connected together and to the feedback resistor 7a by a line 63, and the lower contacts 59 and 62 are connected together and to ground at 9a by a line 64. The vibrating arm 60 is connected to one end of the low-impedance primary windings 65 of an input impedance-matching transformer 66, and vibrating arm 57 is connected to the other end of the primary winding 65. One end of the high-impedance secondary winding 67 of the transformer 66 is grounded at 9a by a line 68; the other end of the secondary winding 67 is connected by a line 69 to the input stage of the second amplifier 8a. A capacitor 70 is connected in parallel with the secondary winding 67. Although the transformer 66 is a step-up transformer, the impedance of the secondary winding 67 may be low enough that the input circuit of the second amplifier 8a may have a much lower impedance than that of the input circuit of the first amplifier 10a, and the usual rugged type input tube can be used rather than a tube designed for electrometer use such as the electrometer tube 26 in the first amplifier 10a. Therefore, the second amplifier 8a would not be damaged by a sudden large change of input voltage. It is apparent from the foregoing description that the present invention provides means for minimizing input variations to a circuit having a high input impedance and subject to damage by sudden large changes of input voltage, and for feeding such input variations back to a low-impedance circuit that may provide substantially equal sensitivity but is not subject to damage by such input variations as would be destructive to elements in the former circuit.

The vibration of the arms 57 and 60 is produced by a vibrator coil 71, which is energized by an alternating voltage source 72 through lines 73 and 74. The alternating voltage source may comprise a step-down transformer connected to an ordinary A. C. power line. During nearly one-half of the vibration cycle the arms 57 and 60 are as shown in Figure 2, with the arm 57 connected to its lower contact 59 and with the other arm 60 connected to its upper contact 61. During this portion of the cycle a current flowing downward in the feedback resistor 7a also flows downward in the primary winding 65 of the transformer 66. During most of the other half-cycle of vibration the arms 57 and 60 are in the positions opposite to those shown in Figure 2, with the arm 57 connected to its upper contact 58 and with the other arm 60 connected to its lower contact 62. During this portion of the cycle a current flowing downward in the feedback resistor 7a flows upward in the primary winding 65 of the transformer 66. Thus an alternating input is provided to the transformer 66, and obviously a current flowing upward in the feedback resistor 7a, because of a feedback voltage at point 14a of opposite polarity to that producing a downward current, would cause opposite current flow from that described above during each half-cycle, and the alternating input provided thereby would be 180° out of phase with that provided by a downward current in the feedback resistor 7a. The vibrator coil 71 and arms 57 and 60 are so constructed that the vibrating cycle produces an alternating input that is either 90° leading or 90° lagging the voltage applied across the vibrator coil 71 from the alternating voltage source 72, depending upon the polarity of the voltage fed back to the point 14a.

The lines 73 and 74 from the alternating voltage source 72 are connected also to one winding 75 of the two-phase servo-motor 16a. The output of the second amplifier 8a is connected by the line 15a to the other winding 76 of the servo-motor 16a, and this output voltage must, of course, be either 90° leading or 90° lagging the voltage across the winding 75, since the output of any conventional amplifier is either in phase with, or 180° out of phase with, its input depending upon the number of stages of amplification and depending upon the use of plate output or cathode-follower circuits, or both. It is a well known characteristic of two-phase motors that one direction of rotation is produced when the voltage across one winding leads the voltage across the other winding, and that rotation in the opposite direction is produced when the voltage across the former winding lags the voltage across the latter. Therefore, the direction of rotation of the servo-motor 16a depends upon the polarity of the feedback voltage at the point 14a, and the servo-motor 16a is so connected to the arm 22a of the slidewire 6a and to the indicator 23a associated with the scale 24 as to provide zero net input voltage at the line 11a and to provide an indication of the value of the variable characteristic measured in the same manner as is described in connection with Figure 1.

Figure 3:
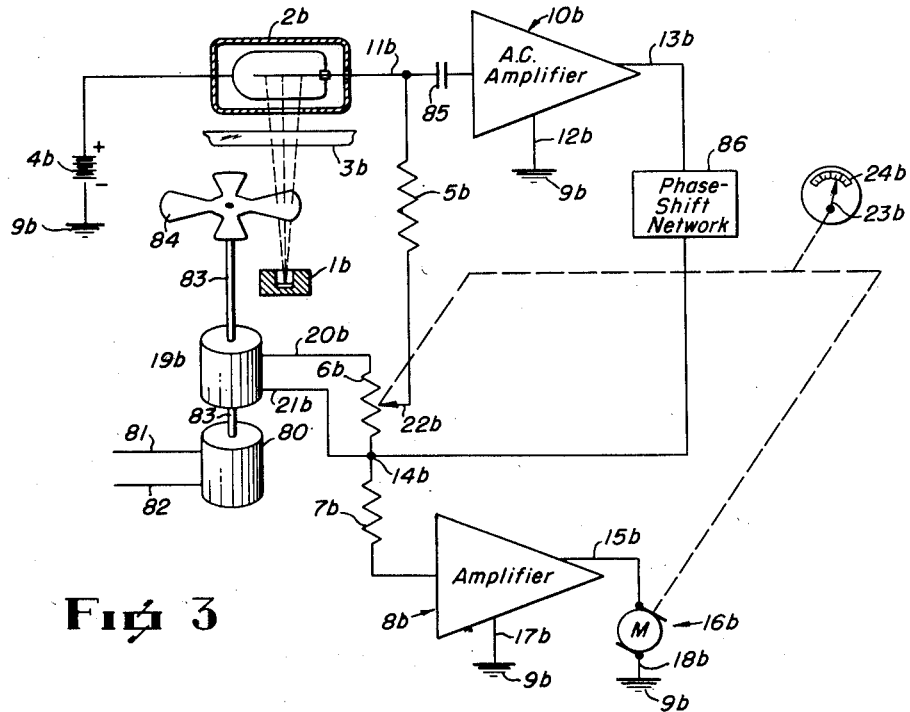
Figure 3 is a schematic diagram illustrating a preferred form of the present invention in a radiation measuring system having an alternating input component.

Figure 3 illustrates a form of the present invention adapted for use with an alternating input. It will be apparent to those versed in the art that the direct current variable signal of the embodiment of the invention shown in Figures 1 and 2 can be made an alternating current signal (in the manner shown, for instance, in Clapp U. S. Patent 2,488,269), and Figure 3 illustrates how such an alternating current signal may be used with a device of the type shown in Figures 1 and 2. The components and points designated by the reference characters 1b through 24b correspond to the components and points designated by the same respective numerals without subscripts in Figure 1, and to those designated with the same numerals with the subscript "a" in Figure 2. In Figure 3, a synchronous motor 80, which is connected by lines 81 and 82 to a suitable source of alternating voltage such as an ordinary 60-cycle A. C. power line is connected by a shaft 83 to drive a rotating shutter 84. The rotating shutter 84 intercepts the radiation emanating from the source of radioactivity 1b; so the radiation arriving at the detector 2b is of a continuously varying intensity, and the voltage appearing across the high resistance 5b has an alternating component. This alternating voltage signal is fed through a blocking condenser 85 and is amplified through an A. C. amplifier 10b. The output of the amplifier 10b is fed back to point 14b in the input circuit, across the feedback resistor 7b. A phase-shift network 86 is placed in the output circuit of the amplifier 10b, to control the phase of the voltage across the feedback resistor 7b to be 180 degrees out of phase with the voltage across the high resistance 5b. This network may be of any suitable type, such as, for example, those shown by Terman, "Radio Engineers Handbook," first edition, 1943, page 949.

An alternator 19b connected to the shaft 83, is driven by the synchronous motor 80 in synchronism with the shutter 84. The frequency of the voltage generated by the alternator 19b is the same as the frequency of the alternating component of voltage appearing across the high resistance 5b. The shutter 84 is so positioned on the shaft 83 with respect to the rotor of the alternator 19b that the alternating voltage across the slidewire 6b is 180 degrees out of phase with the voltage across the high resistance 5b.

The circuit operates in the same manner as described in connection with Figures 1 and 2, except that the voltages across the high resistance 5b and the slidewire 6b, instead of being direct voltages of opposite polarity, are alternating voltages of the same frequency and 180 degrees out of phase; and the feedback voltage to point 14b, instead of being a direct voltage of opposite polarity to the change of net input voltage, is an alternating voltage 180 degrees out of phase with the net change of alternating input voltage. At a given time, of course, the instantaneous voltages are tantamount to the corresponding direct voltages in the circuits of Figures 1 and 2. Since the above voltages are alternating, it is not necessary to include a converter such as the converter 56 of Figure 2 in a circuit of the type shown in Figure 3. The electrical feedback loop of Figure 3 comprises the high resistance 5b, condenser 85, A. C. amplifier 10b, phase network 86, and feedback resistor 7b. The servo-mechanism feedback loop comprises the high resistance 5b, condenser 85, A. C. amplifier 10b, phase network 86, second amplifier 8b, slidewire 6b, and movable arm 22b.

Figure 4:
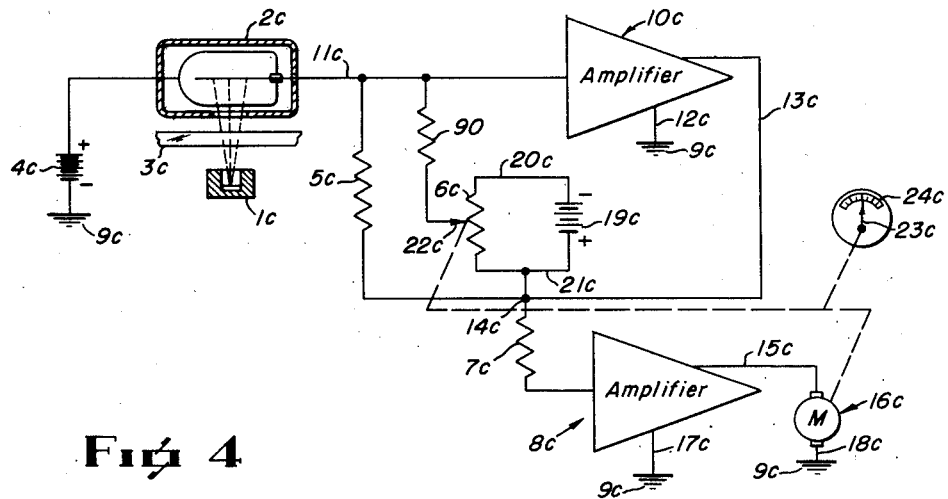
Figure 4 is a diagram illustrating schematically another form of the invention.

In Figure 4, the invention is illustrated in a circuit similar to that of Figure 1, except that the opposing voltage in Figure 4 is applied in parallel with the high resistance across which the input voltage to be measured is developed, instead of in series as in Figure 1. The components and points designated by the reference characters 1c through 24c correspond to the components and points designated by the same respective numerals without subscripts in Figure 1, and to those designated with the same numerals with the subscript "a" in Figure 2 and those designated with the same numerals with the subscript "b" in Figure 3.

The components used in the circuit of Figure 4 are the same as those of Figure 1 with only one additional component, an isolation resistor 90, one end of which is connected to the line 11c. The other end of the isolation resistor 90 is connected to the movable arm 22c of the voltage divider or slidewire 6c. One end of the high resistance 5c is connected to the line 11c as in Figure 1; but the other end, instead of being connected to the movable arm 22c of the slidewire 6c, is connected to the feedback point 14c at one end of the feedback resistor 7c. Except for these few changes the circuit is identical to that of Figure 1.

To provide the required isolation, the resistor 90 should have a considerably higher resistance than that of the high resistance 5c. The combination of the isolation resistor 90, the slidewire 6c, and the voltage source 19c acts as a current source. The circulating current provided by the radiation detector circuit flowing through the high resistance 5c is cancelled by an equal and opposite current provided by this servo-mechanism feedback network.

The operation of the circuit of Figure 4 is the same as that described in connection with the other figures, except that the servo-mechanism feedback network maintains an equal and opposite current, instead of an equal and opposite voltage, to provide zero net input voltage at line 11c. As zero net input voltage is approached and obtained, the circuit of Figure 4 achieves balance in the same manner as do the circuits of Figures 1, 2, and 3. At balance the voltage across the high resistance 5c is zero, and the net current through the high resistance 5c is, of course, zero. The voltage from the point 14c to the point 22c is equal and opposite to the voltage across the isolation resistor 90 provided by the current from the radiation detector 2c. The sensitivity of the measuring system at balance is dependent upon the resistance of the resistor 90 and is not decreased by the shunting resistance 5c since no net current flows in the resistance 5c at balance. Before balance is reached, however, part of the current from the radiation detector 2c flows through the resistance 5c while part of the current flows through the resistor 90, and the net voltage to the amplifier 10c is reduced below what it would be if the resistance 5c were not present. Greater protection against large input voltage variation can be obtained, therefore, without reducing the sensitivity, by using the parallel connection of the resistance 5c shown in Figure 4.

It will be apparent to those skilled in the art that the parallel circuit connections of Figure 4 could be substituted for the series connection in the circuits of Figures 2 and 3 as well as in the circuit of Figure 1.

It will also be apaprent that other sources of input voltage, providing measures of variable characteristics other than thickness and not necessarily involving radiation or radiation detectors, could be substituted for the input voltage sources shown in Figures 1 through 4 for convenience of illustration. Obviously, some input voltage sources would not necessarily require such high resistances for the element 5, 5a, 5b, or 5c, and in some cases the input voltage to be measured might preferably be connected across the element 5, 5a, 5b, or 5c rather than from ground to the farther side of the element 5, 5a, 5b, or 5c as is shown in the figures herein. Such adaptations and modifications are understood to be within the scope of this invention, as the choices of details involved are well within the abilities of those skilled in the art.

From the foregoing description it is clear that among the essential features of the disclosed circuits are the two distinct feedback circuits, one an electrical feedback system that immediately feeds back the amplified change in voltage in order to protect critical circuit elements, and a second necessarily slower moving, servo-mechanism feedback system that operates an indicating system.

The indicator referred to may, if desired, include a strip chart recorder providing a continuous record of the value of the variable characteristic measured.

While the invention described herein has particular utility in radiation thickness measuring instruments, it obviously is applicable to many types of measuring instrument, especially those in which there is danger of large input voltage or current variations damaging one or more of the circuit elements.

The invention, therefore, should not be considered to be limited to the embodiments disclosed herein. It will be obvious to those skilled in the art that numerous changes, omissions, and additions in the devices described may be made without departing from the scope of this invention.

What is claimed is:

1. In an apparatus for measuring a variable characteristic translatable into a variable voltage, amplifier means having an input circuit connected to said variable voltage, a variable source of nulling voltage connected to said input circuit in opposition to said variable voltage, means responsive to an output signal from said amplifier means controlling the amplitude of voltage produced by said variable source of nulling voltage to produce a zero input to said amplifier means when said apparatus is nulled, said last named means having a first response rate, and means having a substantially instantaneous response rate connected to said input circuit providing a variable balancing voltage of a value to provide substantially zero input to said amplifier means before said nulling voltage has completed its response, said balancing voltage decreasing as said nulling voltage approaches said variable voltage and reaching substantially zero when said null condition is reached.

2. In an apparatus for measuring a variable characteristic translatable into a variable voltage, amplifier means having an input circuit connected to said variable voltage, a variable source of nulling voltage connected to said input circuit in opposition to said variable voltage, means responsive to an output signal from said amplifier means controlling the amplitude of voltage produced by said variable source of nulling voltage to produce a zero input to said amplifier means when said apparatus is nulled, and impedance means connected to said input circuit and receiving a feedback signal from said amplifier means, said feedback signal being connected to said impedance means in opposition to said variable voltage to provide substantially zero input to said amplifier means until said null condition is reached.

3. An apparatus as set out in claim 2 in which said output signal from said amplifier forms said feedback signal.

4. In an apparatus for measuring a variable characteristic translatable into a variable voltage, amplifier means having an input circuit connected to said variable voltage, a variable source of nulling voltage connected to said input circuit in opposition to said variable voltage, electromechanical means responsive to an output signal from said amplifier means controlling the amplitude of voltage produced by said variable source of nulling voltage to produce a zero input to said amplifier when said apparatus is nulled, and impedance means connected to amplifier means, a feedback signal being connected to said impedance means in opposition to said variable voltage to provide substantially zero input to said amplifier means until said null condition is reached.

5. A measuring apparatus as set out in claim 4 wherein said electro-mechanical means comprises a servo-mechanism controlling said source of nulling voltage, and including means controlled by said servo-mechanism for indicating the value of said variable characteristic.

6. A measuring device as set out in claim 4 wherein said variable voltage is developed across a high impedance in said input circuit, and said nulling voltage and impedance means are connected in series with said high impedance.

7. A measuring device as set out in claim 6 wherein said variable voltage has an alternating component; and said nulling voltage is an alternating voltage of the same frequency as, and of opposite phase to, said alternating component of said variable voltage.

8. A measuring device as set out in claim 4 wherein said variable voltage is developed across a high impedance, and said nulling voltage is developed across an impedance connected in parallel with said high impedance through an isolating impedance.

9. In a null-balance measuring circuit for measuring a variable signal and including a source of nulling voltage for opposing and balancing said signal, said source of nulling voltage consisting of a two terminal network comprising; a pair of impedances connected in series, a source of voltage connected to said impedances through a third variable impedance, a fourth impedance connected across said pair of impedances and having a variable tap, a fifth impedance connected between said tap and the connection between said pair of impedances, the terminals of said network being comprised by connections to said fifth impedance and to one of said pair of impedances.

10. An apparatus as set out in claim 9 wherein said fifth impedance is provided with a variable tap, and said one of said pair of impedances is provided with a variable tap, said taps forming said two terminals.

11. In an apparatus for measuring a variable characteristic translatable into a variable voltage, amplifier means having an input circuit connected to said variable voltage, a variable source of nulling voltage connected to said input circuit in opposition to said variable voltage, said source of nulling voltage consisting of a two terminal network comprising; a pair of impedances connected in series, a source of voltage connected to said impedance through a third variable impedance, a fourth impedance connected across and in parallel with said series connected pair of impedances, said fourth impedance having a variable tap, and a fifth impedance connected between said tap and the connection between said pair of impedances, the terminals of said network being comprised by connections to said fifth impedance and to one of said pair of impedances, a servo-mechanism responsive to an output signal from said amplifier means controlling the position of said variable tap on said fourth impedance to control the amplitude of voltage produced by said variable source of nulling voltage to produce a zero input to said amplifier means when said apparatus is nulled, and means connected to said input circuit providing a variable voltage substantially instantaneously and constantly of a value to provide substantially zero input to said amplifier means, said last named means providing said voltage until said null condition is reached.

12. An apparatus as set out in claim 11 wherein said variable voltage is developed across a high resistance in said input circuit and said high resistance is connected to one of said terminals of said network, said means connected to said input circuit and providing a variable voltage comprising an impedance connected to the other terminal of said network and receiving a feedback signal from said amplifier means.

References Cited in the file of this patent

UNITED STATES PATENTS

| 2,363,473 | Ryder | Nov. 21, 1944 |
| 2,447,321 | Ertzman | Aug. 17, 1948 |

(Other references on following page)

| | | |
|---|---|---|
| 2,488,269 | Clapp | Nov. 15, 1949 |
| 2,508,082 | Wald | May 16, 1950 |
| 2,533,079 | Ziebolz | Dec. 5, 1950 |
| 2,549,402 | Vossberg | Apr. 17, 1951 |
| 2,551,964 | Norton | May 8, 1951 |
| 2,569,791 | Wild | Oct. 2, 1951 |
| 2,576,611 | Lang et al. | Nov. 27, 1951 |

OTHER REFERENCES

Publication (British): The Institution of Electrical Engineers, volume 98, part II, No. 61, pp. 59–66, published February 1951.

Publication: Servomechanism Fundamentals, Lauer, Lesnich and Matson, published by McGraw-Hill in 1947.